(12) United States Patent
Chen et al.

(10) Patent No.: US 12,034,500 B2
(45) Date of Patent: Jul. 9, 2024

(54) COMMUNICATION APPARATUS AND METHOD FOR HANDLING AN Rx BEAM FOR THE PDSCH RECEPTION

(71) Applicant: MediaTek Singapore Pte. Ltd., Singapore (SG)

(72) Inventors: Biwei Chen, Shanghai (CN); Chong-You Lee, Hsinchu (TW); Fei Xu, Beijing (CN); Wei-Jen Chen, Hsinchu (TW); Yabo Li, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 60 days.

(21) Appl. No.: 17/985,898

(22) Filed: Nov. 13, 2022

(65) Prior Publication Data

US 2024/0056132 A1 Feb. 15, 2024

(30) Foreign Application Priority Data

Aug. 10, 2022 (CN) .......................... 202210954411.9

(51) Int. Cl.
*H04B 7/0408* (2017.01)
*H04B 7/06* (2006.01)
*H04W 72/044* (2023.01)
*H04W 72/23* (2023.01)

(52) U.S. Cl.
CPC ......... *H04B 7/0408* (2013.01); *H04B 7/0695* (2013.01); *H04W 72/046* (2013.01); *H04W 72/23* (2023.01)

(58) Field of Classification Search
CPC ... H04B 7/0408; H04B 7/0695; H04W 72/23; H04W 72/046
See application file for complete search history.

(56) References Cited

U.S. PATENT DOCUMENTS

| | | | | |
|---|---|---|---|---|
| 11,647,494 | B2* | 5/2023 | Zhu | H04B 7/0617 370/329 |
| 2020/0328798 | A1* | 10/2020 | Huang | H04W 16/28 |
| 2023/0041108 | A1* | 2/2023 | Zhang | H04W 72/20 |

(Continued)

FOREIGN PATENT DOCUMENTS

| | | |
|---|---|---|
| EP | 3 745 608 A1 | 12/2020 |
| WO | 2022/029467 A1 | 2/2022 |

*Primary Examiner* — Janice N Tieu
(74) *Attorney, Agent, or Firm* — Winston Hsu

(57) ABSTRACT

A communication apparatus comprises a radio transceiver and a modem processor. The radio transceiver is configured to transmit or receive signals. The modem processor is coupled to the radio transceiver and configured to perform operations comprising: performing a beam management, to train a first receiver (Rx) beam; receiving a physical downlink shared channel (PDSCH) according to the first Rx beam; selecting at least one second Rx beam according to a scenario, if a first performance indicator of the first Rx beam is lower than a previous first performance indicator of the first Rx beam by a first threshold; determining at least one second performance indicator of the PDSCH according to a round-robin test; selecting a third Rx beam from the at least one second Rx beam according to the at least one second performance indicator; and receiving the PDSCH according to the third Rx beam.

16 Claims, 3 Drawing Sheets

(56) References Cited

U.S. PATENT DOCUMENTS

2023/0171788 A1* 6/2023 Kung .................... H04B 7/0695
                                                    370/329
2023/0179283 A1* 6/2023 Yang .................. H04B 7/06952
                                                    375/346

* cited by examiner

COMMUNICATION APPARATUS AND METHOD FOR HANDLING AN Rx BEAM FOR THE PDSCH RECEPTION

BACKGROUND

A channel state information reference signal (CSI-RS) plays an important role in 5G (fifth generation) New Radio (NR). In 5G NR, the CSI-RS is used for the synchronization (e.g., the time/frequency tracking), the CSI computation, the Layer 1 Reference Symbol Received Power (L1-RSRP) computation and the mobility, etc. A synchronization signal block (SSB) and a tracking reference signal (TRS) are types of the CSI-RS, and are measured by a User Equipment (UE) to perform a beam management. To compensate a path loss in a 5G NR Frequency Range 2 (FR2) system, the UE is equipped with multiple antennas in an antenna-array. For a downlink (DL) data reception, the beam management can be used for performing a channel estimation on the SSB or the TRS and optimizes a receiver (Rx) beam according to a spatial correlation matrix. However, a beam management result is not optimal for a physical DL shared channel (PDSCH) reception in some scenarios.

Therefore, a communication apparatus and a method for handling the Rx Beam to improve the performance of the PDSCH reception are highly required.

SUMMARY

It is an objective of the invention to provide a communication apparatus, in order to solve the above problem.

An embodiment of the invention provides a communication apparatus comprising a radio transceiver and a modem processor. The radio transceiver is configured to transmit or receive wireless signals in a wireless network. The modem processor is coupled to the radio transceiver and configured to perform operations comprising: performing a beam management, to train a first receiver (Rx) beam for receiving a physical downlink (DL) shared channel (PDSCH); receiving the PDSCH according to the first Rx beam; selecting at least one second Rx beam from at least one Rx beam candidate according to a scenario, if a first performance indicator of the first Rx beam during a first duration is lower than a previous first performance indicator of the first Rx beam during a first previous duration by a first threshold; determining at least one second performance indicator of the PDSCH corresponding to the at least one second Rx beam according to a round-robin test on the at least one second Rx beam during a second duration; selecting a third Rx beam from the at least one second Rx beam according to the at least one second performance indicator; and receiving the PDSCH according to the third Rx beam.

An embodiment of the invention provides a method for handling a receiver (Rx) beam for a physical downlink (DL) shared channel (PDSCH) reception comprising: performing a beam management, to train a first Rx beam for receiving a PDSCH; receiving the PDSCH according to the first Rx beam; selecting at least one second Rx beam from at least one Rx beam candidate according to a scenario, if a first performance indicator of the first Rx beam during a first duration is lower than a previous first performance indicator of the first Rx beam during a previous first duration by a first threshold; determining at least one second performance indicator of the PDSCH corresponding to the at least one second Rx beam according to a round-robin test on the at least one second Rx beam during a second duration; selecting a third Rx beam from the at least one second Rx beam according to the at least one second performance indicator; and receiving the PDSCH according to the third Rx beam.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
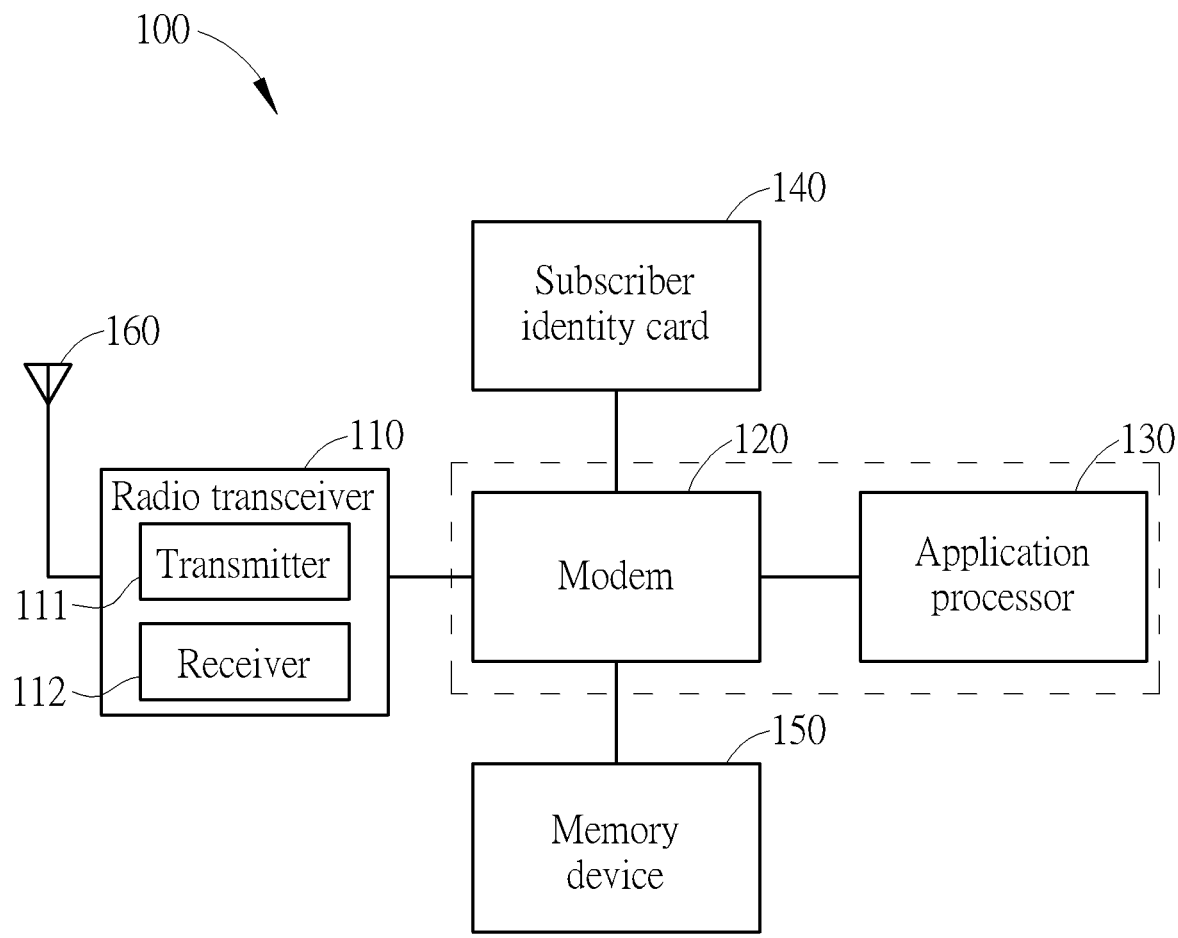
FIG. 1 is an exemplary block diagram of a communication apparatus according to an embodiment of the invention.

FIG. 1 is an exemplary block diagram of a communication apparatus 100 according to an embodiment of the invention. The communication apparatus 100 may be a portable electronic device, such as a Mobile Station (MS), which may be interchangeably referred to as User Equipment (UE). The communication apparatus 100 may comprise a radio transceiver 110, a modem 120, an application processor 130, a subscriber identity card 140, a memory device 150 and at least one antenna 160. The radio transceiver 110 may be configured to transmit and/or receive wireless signals to and/or from a network device in a wireless network via the antenna module, so as to communicate with the network device via a communication link established between the communication apparatus 100 and the network device. The radio transceiver 110 may comprise a receiver 112 configured to receive wireless signals and a transmitter 111 configured to transmit wireless signals. The radio transceiver 110 may be further configured to perform radio frequency (RF) signal processing. For example, the receiver 112 may convert the received signals into intermediate frequency (IF) or baseband signals to be processed, or the transmitter 111 may receive the IF or baseband signals from the modem 120 and convert the received signals into wireless signals to be transmitted to the network device in the wireless network or in an access network (e.g., acellular network or a wireless local access network). According to an embodiment of the invention, the network device may be a cell, a Node-B (NB), an evolved Node-B (eNB), a g Node-B (gNB), a base station, a Mobility Management Entity (MME), an Access and Mobility Management Function (AMF) device, etc., at the network side and communicating with the communication apparatus 100 by the wireless signals via the communication link.

The transmitter 111 and the receiver 112 of the radio transceiver 110 may comprise a plurality of hardware devices to perform RF conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, etc.

The modem 120 may be configured to handle corresponding communication protocol operations and processing the IF or baseband signals received from or to be transmitted to the radio transceiver 110. The application processor 130 is configured to run the operating system of the communication apparatus 100 and to run application programs installed in the communication apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a subscriber identity module (SIM), universal mobile telecommunication system (UMTS) SIM (USIM), removable user identity module (R-UIM) or code division multiple access (CDMA) SIM (CSIM) card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communication apparatus may further comprise some peripheral devices not shown in FIG. 1. In another example, in some embodiments of the invention, the communication apparatus may further comprise a central controller coupled to the modem. 120 and the application processor 130. Therefore, the invention should not be limited to what is shown in FIG. 1.

In some embodiments of the invention, the communication apparatus is capable of supporting multiple radio access technologies (RATs) communications via the single-card structure as shown in FIG. 1. It should be noted that, although FIG. 1 shows a single-card application, the invention should not be limited herein. For example, in some embodiments of the invention, the communication apparatus may comprise multiple subscriber identity cards to support the multi-RATs communications, in either a single-standby or a multiple-standby manner. In the multi-RATs communication applications, the modem, the radio transceiver and/or the antenna module may be shared by the subscriber identity card(s) and may have the capability of handling the operations of different RATs and processing the corresponding RF, IF or baseband signals in compliance with the corresponding communication protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus. Therefore, the invention should not be limited to what is shown in FIG. 1.

It should be further noted that in some embodiments of the invention, the communication apparatus may further support multiple IMSIs.

Figure 2:
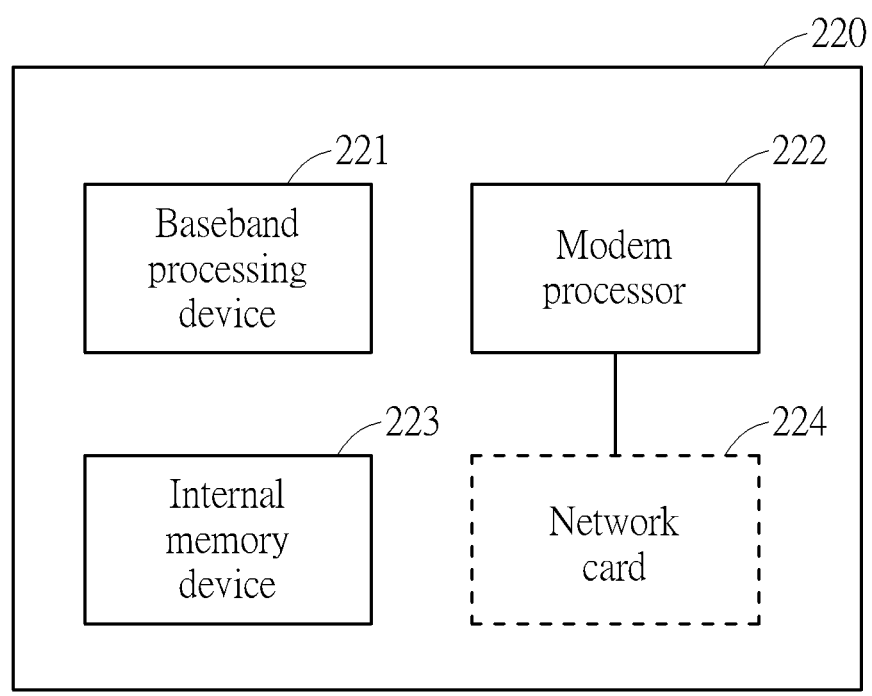
FIG. 2 is an exemplary block diagram of a modem according to an embodiment of the invention.

FIG. 2 is an exemplary block diagram of a modem 220 according to an embodiment of the invention. The modem 220 may be the modem 120 shown in FIG. 1 and may comprise at least a baseband processing device 221, a processor 222 (to discriminate from the "application processor" shown in FIG. 1, hereinafter named the "modem processor"), an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The modem processor 222 may control the operations of the modem 220. According to an embodiment of the invention, the modem processor 222 may be arranged to execute the program codes of the corresponding software module of the modem 220. The modem processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The modem processor 222 may also read data from the subscriber identity card coupled to the modem, such as the subscriber identity card 140, and write data to the subscriber identity card. The internal memory device 223 may store system data and user data for the modem 220. The modem processor 222 may also access the internal memory device 223.

The network card 224 provides Internet access services for the communication apparatus. It should be noted that, although the network card 224 shown in FIG. 2 is configured inside of the modem, the invention should not be limited thereto. In some embodiments of the invention, the communication apparatus may also comprise a network card configured outside of the modem, or the communication apparatus may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem 220 may also comprise more than one processor and/or more than one baseband processing device. For example, the modem 220 may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the modem processor 222 may be integrated into one processing unit, and the modem may comprise one or multiple such processing units, for supporting multi-RAT operations. Therefore, the invention should not be limited to what is shown in FIG. 2.

According to an embodiment of the invention, the modem processor 222 and the application processor 130 may comprise a plurality of logics designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units. Generally, the modem processor 222 may be configured to perform operations of relative lower protocol layers while the application processor 130 may be configured to perform operations of relative higher protocol layers. Therefore, in some embodiments of the invention, the application processor 130 may be regarded as the upper layer entity or upper layer processing circuit with respect to the modem processor 222 and the modem processor 222 may be regarded as the lower layer entity or lower layer processing circuit with respect to the application processor 130.

It should be noted that, in the 5G (fifth generation) New Radio (NR) Frequency Range 2 (FR2) system, the communication apparatus 100 may perform a beam management to optimize a receiver (Rx) beam, but a beam management result is not optimal for a physical downlink (DL) shared channel (PDSCH) reception in some scenarios. For example, the SSB and the TRS are with one port. The Rx beam of a weaker subarray is not reliable, when a subarray imbalance occurs. For example, the SSB and the TRS with one port do not reflect a 2 layer PDSCH performance. For example, a co-channel interference (CCI) on the SSB or the TRS is not the same as that on the PDSCH. For example, for a multipath case, a beamforming for one angle of arrival (AoA) provides a better performance than a beamforming for multiple AoAs. For example, one antenna Rx beam (e.g., 1 vertical and 1 horizontal (1V1H)) provides a better performance than a multiple antenna Rx beam (e.g., 4V4H).

Figure 3:
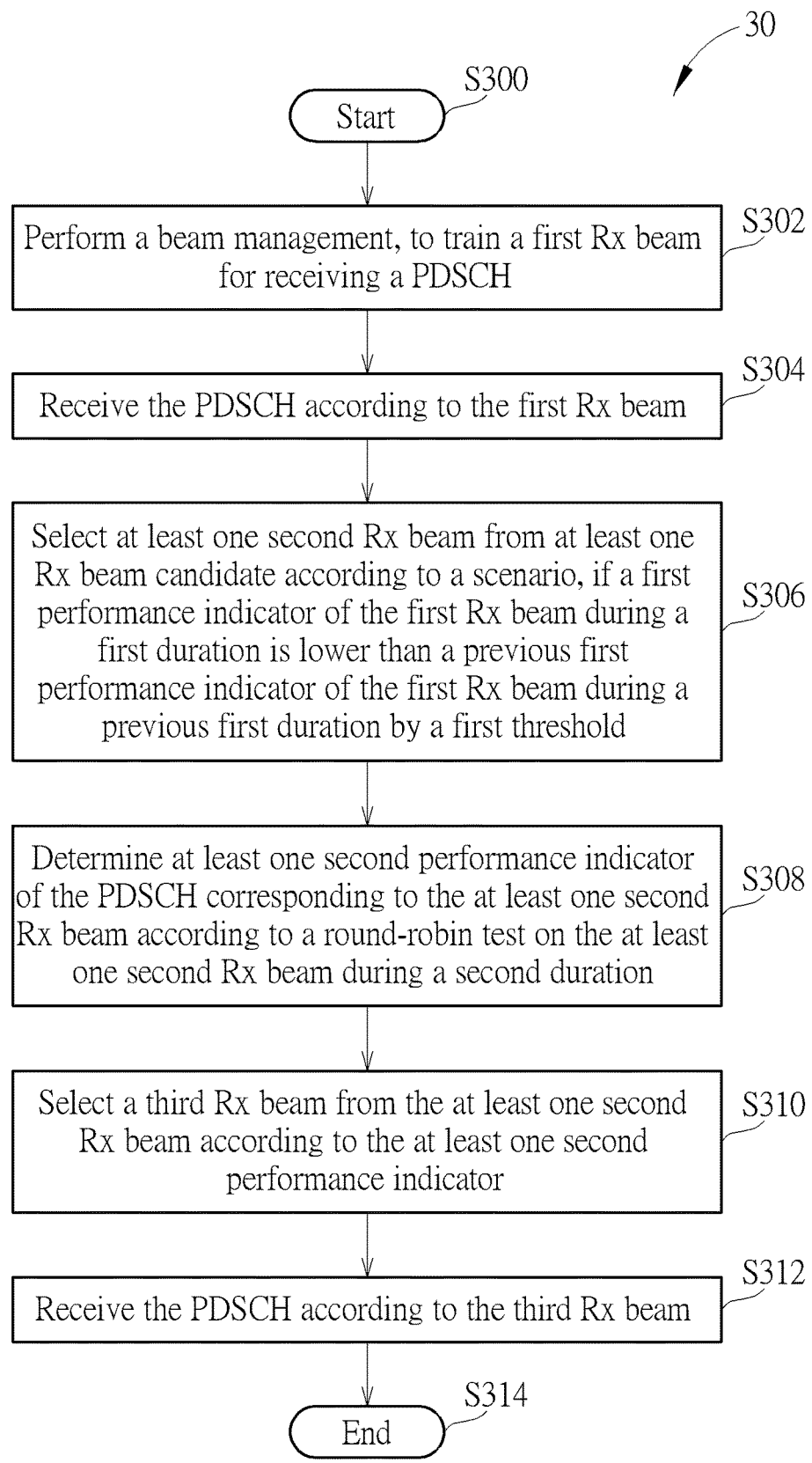
FIG. 3 is a flowchart of a process according to an embodiment of the invention.

FIG. 3 is a flowchart of a process 30 utilized in a communication apparatus (e.g., the communication apparatus 100 shown in FIG. 1) according to an embodiment of the invention, to handle an Rx beam for the PDSCH reception. The process 30 comprises the following steps:

Step S300: Start.

Step S302: Perform a beam management, to train a first Rx beam for receiving a PDSCH.

Step S304: Receive the PDSCH according to the first Rx beam.

Step S306: Select at least one second Rx beam from at least one Rx beam candidate according to a scenario, if a first performance indicator of the first Rx beam during a first duration is lower than a previous first performance indicator of the first Rx beam during a previous first duration by a first threshold.

Step S308: Determine at least one second performance indicator (such as, error rate) of the PDSCH corresponding to the at least one second Rx beam according to a round-robin test on the at least one second Rx beam during a second duration.

Step S310: Select a third Rx beam from the at least one second Rx beam according to the at least one second performance indicator.

Step S312: Receive the PDSCH according to the third Rx beam.

Step S314: End.

According to the process 30, the communication apparatus selects an Rx beam with a better performance according to an Rx beam hypothesis test (i.e., Steps S306, S308 and S310), and receives the PDSCH (e.g., 2-port data) according to the Rx beam with the better performance. Therefore, the performance of the PDSCH reception (e.g., an error rate of the PDSCH) can be improved.

Realization of the process 30 is not limited to the above description. The following embodiments of the invention may be applied to realize the process 30.

In an embodiment of the invention, the at least one Rx beam candidate comprises at least one of a last optimal Rx beam, at least one predetermined Rx beam, at least one Rx beam with different antenna combination, at least one Rx beam with different antenna arrays or at least one Rx beam for receiving a reference signal (RS). In an embodiment of the invention, the at least one predetermined Rx beam comprises at least one beambook-mapping Rx beam. In an embodiment of the invention, the at least one Rx beam for receiving the RS comprises at least one Rx beam with a high signal to noise ratio (SNR) on a synchronization signal block (SSB), a tracking reference signal (TRS) or a demodulation reference signal (DMRS). In an embodiment of the invention, the first duration is 1 second, but not limited herein.

In an embodiment of the invention, the communication apparatus selects the at least one Rx beam with different antenna arrays from the at least one Rx beam candidate, when a dynamic blockage of the communication apparatus occurs. In an embodiment of the invention, the communication apparatus selects the at least one Rx beam for receiving the RS from the at least one Rx beam candidate, when there is a CCI on the PDSCH. In an embodiment of the invention, the communication apparatus selects the last optimal Rx beam from the at least one Rx beam candidate, when a sudden drop of mutual information (MI) of a DMRS comprised in the PDSCH occurs.

In an embodiment of the invention, the first performance indicator (e.g., a key performance indicator (KPI)) comprises at least one of an error rate of the PDSCH corresponding to the first Rx beam, a SNR of a DMRS comprised in the PDSCH corresponding to the first Rx beam or MI of the DMRS. The PDSCH corresponding to the first Rx beam may be the PDSCH received by the communication apparatus according to (or via) the first Rx beam.

In an embodiment of the invention, the second performance indicator (e.g., a key performance indicator (KPI)) comprises at least one of an error rate of the PDSCH corresponding to the second Rx beam, a SNR of a DMRS comprised in the PDSCH corresponding to the second Rx beam or MI of the DMRS. The PDSCH corresponding to the second Rx beam may be the PDSCH received by the communication apparatus according to (or via) the second Rx beam.

In an embodiment of the invention, the communication apparatus selects the second Rx beam from the at least one second Rx beam as the third Rx beam, if the second performance indicator corresponding to the second Rx beam is better than the second performance indicator corresponding to the other second Rx beams.

To sum up, the present invention provides a communication apparatus and a method for handling an Rx beam for the PDSCH reception. The communication apparatus performs an Rx beam hypothesis test to select an Rx beam for the PDSCH reception, and receives a PDSCH according to the Rx beam. Therefore, the performance of the PDSCH reception is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus, comprising:
   a radio transceiver, transmitting or receiving wireless signals in a wireless network; and
   a modem processor, coupled to the radio transceiver and configured to perform operations comprising:
   performing a beam management, to train a first receiver (Rx) beam for receiving a physical downlink (DL) shared channel (PDSCH);
   receiving the PDSCH according to the first Rx beam;
   selecting at least one second Rx beam from at least one Rx beam candidate according to a scenario, if a first performance indicator of the first Rx beam during a first duration is lower than a previous first performance indicator of the first Rx beam during a previous first duration by a first threshold;
   determining at least one second performance indicator of the PDSCH corresponding to the at least one second Rx beam according to a round-robin test on the at least one second Rx beam during a second duration;
   selecting a third Rx beam from the at least one second Rx beam according to the at least one second performance indicator; and
   receiving the PDSCH according to the third Rx beam.

2. The communication apparatus of claim 1, wherein the at least one Rx beam candidate comprises at least one of a last optimal Rx beam, at least one predetermined Rx beam, at least one Rx beam with different antenna combination, at least one Rx beam with different antenna arrays or at least one Rx beam for receiving a reference signal (RS).

3. The communication apparatus of claim 2, wherein the step of selecting the at least one second Rx beam from the at least one Rx beam candidate according to the scenario comprises:

selecting the at least one Rx beam with different antenna arrays from the at least one Rx beam candidate, when a dynamic blockage of the communication apparatus occurs.

4. The communication apparatus of claim 2, wherein the step of selecting the at least one second Rx beam from the at least one Rx beam candidate according to the scenario comprises:
   selecting the at least one Rx beam for receiving the RS from the at least one Rx beam candidate, when there is a co-channel interference (CCI) on the PDSCH.

5. The communication apparatus of claim 2, wherein the step of selecting the at least one Rx second beam from the at least one Rx beam candidate according to the scenario comprises:
   selecting the last optimal Rx beam from the at least one Rx beam candidate, when a sudden drop of mutual information (MI) of a demodulation deference signal (DMRS) comprised in the PDSCH occurs.

6. The communication apparatus of claim 1, wherein the first performance indicator comprises at least one of an error rate of the PDSCH corresponding to the first Rx beam, a signal to noise ratio (SNR) of a DMRS comprised in the PDSCH corresponding to the first Rx beam or MI of the DMRS.

7. The communication apparatus of claim 1, wherein the second performance indicator comprises at least one of an error rate of the PDSCH corresponding to the second Rx beam, a signal to noise ratio (SNR) of a DMRS comprised in the PDSCH corresponding to the second Rx beam or MI of the DMRS.

8. The communication apparatus of claim 1, wherein the communication apparatus selects the third Rx beam from the at least one second Rx beam, if the second performance indicator corresponding to the third Rx beam is better than the second performance indicator corresponding to the other second Rx beams.

9. A method for handling a receiver (Rx) beam for a physical downlink (DL) shared channel (PDSCH) reception, comprising:
   performing a beam management, to train a first receiver (Rx) beam for receiving a PDSCH;
   receiving the PDSCH according to the first Rx beam;
   selecting at least one second Rx beam from at least one Rx beam candidate according to a scenario, if a first performance indicator of the first Rx beam during a first duration is lower than a previous first performance indicator of the first Rx beam during a previous first duration by a first threshold;
   determining at least one second performance indicator of the PDSCH corresponding to the at least one second Rx beam according to a round-robin test on the at least one second Rx beam during a second duration;
   selecting a third Rx beam from the at least one second Rx beam according to the at least one second performance indicator; and
   receiving the PDSCH according to the third Rx beam.

10. The method of claim 9, wherein the at least one Rx beam candidate comprise at least one of a last optimal Rx beam, at least one predetermined Rx beam, at least one Rx beam with different antenna combination, at least one Rx beam with different antenna arrays or at least one Rx beam for receiving a reference signal (RS).

11. The method of claim 10, wherein the step of selecting the at least one second Rx beam from the at least one Rx beam candidate according to the scenario comprises:

selecting the at least one Rx beam with different antenna arrays from the at least one Rx beam candidate, when a dynamic blockage of the communication apparatus occurs.

12. The method of claim 10, wherein the step of selecting the at least one second Rx beam from the at least one Rx beam candidate according to the scenario comprises:
selecting the at least one Rx beam for receiving the RS from the at least one Rx beam candidate, when there is a co-channel interference (CCI) on the PDSCH.

13. The method of claim 10, wherein the step of selecting the at least one Rx second beam from the at least one Rx beam candidate according to the scenario comprises:
selecting the last optimal Rx beam from the at least one Rx beam candidate, when a sudden drop of mutual information (MI) of a demodulation deference signal (DMRS) comprised in the PDSCH occurs.

14. The method of claim 9, wherein the first performance indicator comprises at least one of an error rate of the PDSCH corresponding to the first Rx beam, a signal to noise ratio (SNR) of a DMRS comprised in the PDSCH corresponding to the first Rx beam or MI of the DMRS.

15. The method of claim 9, wherein the second performance indicator comprises at least one of an error rate of the PDSCH corresponding to the second Rx beam, a signal to noise ratio (SNR) of a DMRS comprised in the PDSCH corresponding to the second Rx beam or MI of the DMRS.

16. The method of claim 9, wherein the communication apparatus selects the third Rx beam from the at least one second Rx beam, if the second performance indicator corresponding to the third Rx beam is better than the second performance indicator corresponding to the other second Rx beams.

* * * * *